(12) United States Patent
Barosi et al.

(10) Patent No.: US 10,373,354 B2
(45) Date of Patent: Aug. 6, 2019

(54) GENERATING RADIAL HIERARCHICAL NETWORK CHARTS TO CONVEY ORGANIZATIONAL STRUCTURES AND ASSOCIATED PERFORMANCE DATA

(71) Applicant: ALIXPARTNERS, LLP, Southfield, MI (US)

(72) Inventors: Francesco Barosi, Chicago, IL (US); Giuseppe Gasparro, New York, NY (US); Giacomo Cantu, Chicago, IL (US); Jeff Goldstein, Boston, MA (US); Luca Ridolfi, Milan (IT)

(73) Assignee: ALIXPARTNERS, LLP, Southfield, MI (US)

( * ) Notice: Subject to any disclaimer, the term of this patent is extended or adjusted under 35 U.S.C. 154(b) by 209 days.

(21) Appl. No.: 15/305,626

(22) PCT Filed: Apr. 23, 2014

(86) PCT No.: PCT/US2014/035092
§ 371 (c)(1),
(2) Date: Oct. 20, 2016

(87) PCT Pub. No.: WO2015/171099
PCT Pub. Date: Nov. 12, 2015

(65) Prior Publication Data
US 2017/0046860 A1 Feb. 16, 2017

(51) Int. Cl.
*G06T 11/20* (2006.01)
*G06T 11/00* (2006.01)
(Continued)

(52) U.S. Cl.
CPC .......... *G06T 11/206* (2013.01); *G06Q 10/067* (2013.01); *G06T 11/001* (2013.01); *G06T 11/60* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 6,219,053 B1 * | 4/2001 | Tachibana | G06F 3/0481 345/440 |
| 6,222,559 B1 * | 4/2001 | Asano | G06T 11/206 345/440 |

(Continued)

OTHER PUBLICATIONS

International Search Report and Written Opinion of the International Searching Authority issued in PCT/US2014/035092, dated Jan. 22, 2015; ISA/US.

(Continued)

*Primary Examiner* — Jennifer N To
*Assistant Examiner* — Beau D Spratt
(74) *Attorney, Agent, or Firm* — Harness, Dickey & Pierce, P.L.C.

(57) ABSTRACT

The computer-implemented tool generates radial organization charts by ingesting hierarchical structured data, with associated performance attributes, and populating a virtual reporting tree that stores tree structure and radial structure information. The graphing server populates the virtual reporting tree while adding ghost nodes to ensure symmetry. The graphing server calculates and assigns radial and angular positional information to each node and uses that positional information to generate the radial organizer chart, applying coloring information to selected nodes and graphically represented radial relationship lines based on the structure and associated performance attributes from the ingested data.

20 Claims, 12 Drawing Sheets

(51) Int. Cl.
*G06T 11/60* (2006.01)
*G06Q 10/06* (2012.01)
*G06F 3/0482* (2013.01)

(56) References Cited

U.S. PATENT DOCUMENTS

| | | | | |
|---|---|---|---|---|
| 6,377,287 | B1* | 4/2002 | Hao | G06F 16/904 |
| | | | | 715/853 |
| 7,046,248 | B1* | 5/2006 | Perttunen | G06F 3/0481 |
| | | | | 345/440 |
| 8,332,782 | B1 | 12/2012 | Chang et al. | |
| 2008/0275861 | A1* | 11/2008 | Baluja | G06N 5/02 |
| 2011/0016099 | A1 | 1/2011 | Peer et al. | |
| 2011/0138340 | A1* | 6/2011 | Holm-Petersen | G06Q 10/06 |
| | | | | 715/854 |
| 2014/0129320 | A1* | 5/2014 | Jebara | G06Q 10/00 |
| | | | | 705/14.42 |

OTHER PUBLICATIONS

International Preliminary Report on Patentability (Chapter II) issued in PCT/US/2014/035092, date of completion May 12, 2016 (with 11 page annex); IPEA/US.

Supplementary European Search Report for parallel application EP 14728013, EPO/Munich, dated Aug. 4, 2017.

Greg Book et al: "Radial Tree Graph Drawing Algorithm for Representing Large Hierarchies", Dec. 1, 2001 (Dec. 1, 2001), XP55394294, Retrieved from the Internet: URL:http://pdfs.semanticscholar.org/1f25/358079eb4dd92e149e9090fb50f6926ceec0.pdf [retrieved on Jul. 27, 2017] section 2 "Graph Drawing Algorithm".

Geoffrey M. Draper et al: "A Survey of Radial Methods for Information Visualization", IEEE Transactions on Visualization and Computer Graphics, IEEE Service Center, Los Alamitos, CA, US, vol. 15, No. 5, Sep. 1, 2009 (Sep. 1, 2009), pp. 759-776, XP011344571, ISSN: 1077-2626, DOI:10.1109/TVCG.2009.23 the whole document.

Christian Bachmaier et al: "A Radial Adaptation of the Sugiyama Framework for Hierarchical Graph Drawing", Apr. 1, 2006 (Apr. 1, 2006), XP55394299, Retrieved from the Internet: URL:http://www.infosun.fim.uni-passau.de/chris/down/MIP-0603.pdf [retrieved on Jul. 27, 2017] the whole document.

Patrick Healy et al: "Hierarchical Drawing Algorithms Current Approaches and Their Limitations" In: "Handbook of Graph Drawing and Visualization", Jun. 24, 2013 (Jun. 24, 2013), CRC Press, XP55394296, ISBN: 978-1-58488-412-5 pp. 409-453, sections 13.1 and 13.7.

Examination Report for EP Application No. 14 728 013.5 dated Jan. 16, 2019; 10 pages.

* cited by examiner

| Virtual tree structure table (#tmp_SPIDER_DATA) | | | | | |
|---|---|---|---|---|---|
| ID | name | Mgr_ID | level (lvl) | ghost_flag | children |
| | | | | | |

Fig. 7

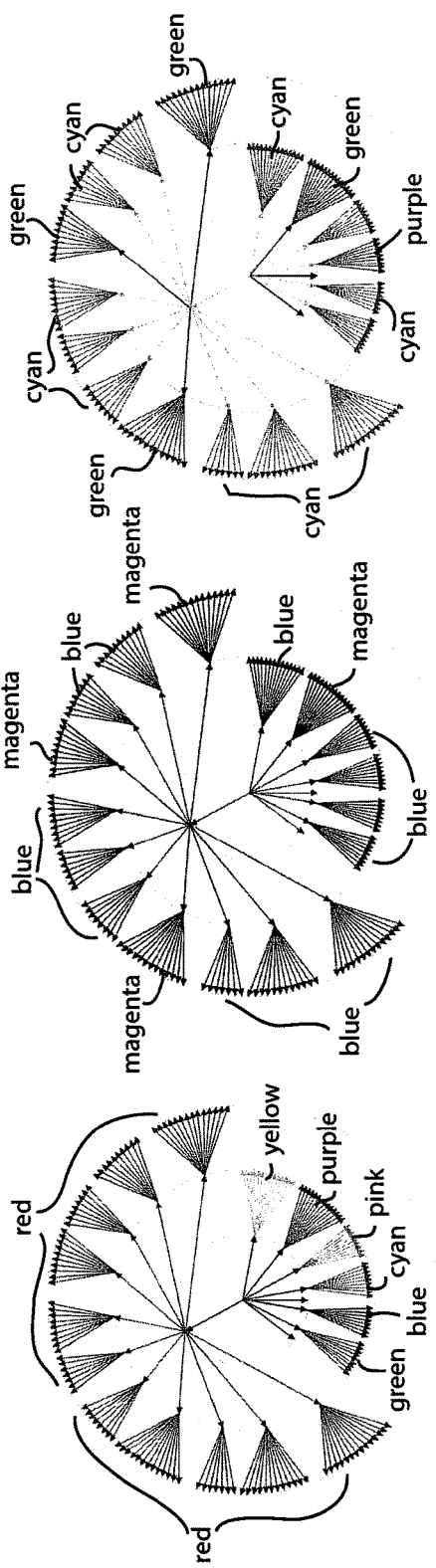
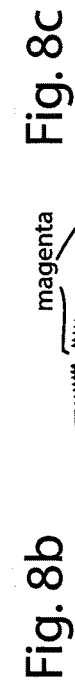
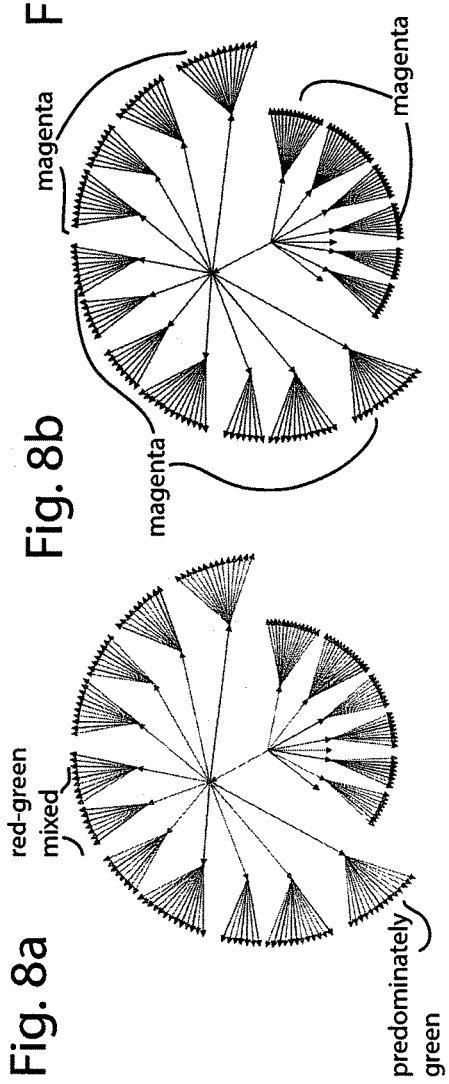
Fig. 8a
Fig. 8b
Fig. 8c
Fig. 8d
Fig. 8e

GENERATING RADIAL HIERARCHICAL NETWORK CHARTS TO CONVEY ORGANIZATIONAL STRUCTURES AND ASSOCIATED PERFORMANCE DATA

CROSS REFERENCE TO RELATED APPLICATIONS

This application is a U.S. National Phase Application under 35 U.S.C. 371 of International Application No. PCT/US2014/035092 filed on Apr. 23, 2014. The entire disclosure of the above application is incorporated herein by reference.

FIELD

The present disclosure relates generally to computer-generated business charting. More particularly the disclosure relates to a computer apparatus and method to ingest business organization and performance data and render that data in a radial hierarchical chart, or radial organizer chart, which exposes various dimensions to suit a user inquiry.

BACKGROUND

Most businesses are organized according to a tree-structured hierarchy that represents departments and/or personnel as nodes, linked according to reporting structure, to define what is conventionally called an organizational chart or org chart. While the org chart is helpful in conveying a corporate hierarchy (who reports to whom) the org chart can become cumbersome in large organizations. Moreover, being designed primarily to illustrate the organizational architecture, the org chart is not so useful in conveying performance dimensions, such as which sales persons closed the most deals, or which divisions are most profitable under different business conditions. Indeed, sometimes the classic org chart can even mask important underlying performance issues or other problems within an organization. For example, a classic org chart will not reveal that the company's highly dispersed marketing teams are not taking advantage of the company's scale (each team may be focused on a niche market, missing the opportunity for cross-selling). Similarly, a classic org chart will not reveal that over half of the people in the sales organization are not customer facing (they may be performing internal operational or support roles that are blind to customer needs).

Org charts, by their very nature, are static tools that capture and present a snapshot of the instantaneous architectural state of an organization. As such, the classic org chart falls short when plotting how to best integrate the merger of one company into another, how to cut an organization's costs, or how to best divest an underperforming division. With the classic org chart it is difficult to play different "what-if" scenarios in deciding, for example, how best to absorb the resources of the acquired company. The same is true when planning cost cutting or divestitures. If the IT department is transferred as part of the accounting function of the divested company, will it leave the surviving company without needed resources? These are some of the kinds of questions that business planners need to answer.

SUMMARY

This section provides a general summary of the disclosure, and is not a comprehensive disclosure of its full scope or all of its features.

The disclosed technology employs a computer-implemented tool effecting an algorithm to generate an organizational space map or "radial organizer chart" that can be used for analysis and fact-finding. The radial organizer chart appears as a form of radial hierarchical network chart that places reporting levels on different concentric circles with nodes represented as dots or other indicia, so that reporting lines correspond to radial lines between parent and child nodes. The computer-implemented algorithm enforces a symmetry property so that the chart makes efficient use of the display space.

More specifically, the disclosed technology employs a computer-implemented algorithm that ingests hierarchically structured data, storing it in a computer-implemented data structure representing nodes and relational links between nodes (reporting lines). The ingested data can include organization architectural data, extracted for example from human resource records and can also include various performance metrics, extracted from human resource records and other financial and business record databases.

The computer manipulates the ingested data, using it to populate the nodes and relational links of the data structure while identifying missing nodes and inserting ghost nodes for the missing nodes to achieve symmetry. The computer then assesses the populated data structure to assess the number of levels that are represented by the relational links and to determine a nominal radius parameter which it assigns to each level.

The computer generates a virtual reporting tree structure where all nodes, including ghost nodes, are associated according to their reporting lines and then sorted by reporting lines to assign to each node a position in the virtual reporting tree.

Once the virtual reporting tree structure has been generated, the computer then assigns angles to each node based on position within the virtual reporting tree. This is done by rolling up the virtual reporting tree and then calculating angles by counting the number of leaf nodes, including ghost nodes; assigning angles to each leaf node based on its assigned position, using a predefined layout rule, such as applying even increments, or based on business rules. Regarding use of business rules, angles may depend, not just on number of nodes, but on any metric linked to the node (for example, cost.) The computer then uses the median angle of a group of leaf nodes having the same parent as the assigned angle, and thus the positional placement, of the parent node. The procedure iteratively repeats, assigning an angle to each parent node of the leaf nodes and then proceeding in similar fashion to assign angles (positions) to the grandparent nodes, etc., until the root node is reached.

Having thus ascertained the nominal radius parameter, relative positions (node-to-node adjacency) and angles (angular position) for each node, the computer then generates the radial organizer chart by removing or skipping all ghost nodes and plotting the remaining nodes at the radial distance from the center and at the angular position as assigned above. To this chart the computer adds coloring information, based on a user selected coloring algorithm and optionally adds additional node information, as requested by the user. The coloring algorithm may, for example, be based on business rules, where different colors are used to represent different business metrics or values of business metrics (e.g., cost).

In one aspect a computer-implemented tool is thus constructed. The tool can be used to display radial organizer charts by providing it with a source of human resources data and/or business performance and financial data. The user manipulates a user interface to select from among a group of different parameters to explore and the tool generates the radial organizer chart, using coloring to enhance the user selected parameter. The user can change those parameters quickly to quickly view the organization using different parameters (such as cost, sale, performance metrics, etc.). The user can also change the root node, so that a user looking at an org chart could look at the entire organization, or drill down and see a radial organizer chart that only depicts a particular department. The tool can be deployed on the same system that stores the ingested data, or it can be deployed on a local area network, wide area network or the Internet.

In another aspect the computer implemented method comprises ingesting the hierarchically structured data into a tree structure maintained in memory of a computer. The tree structure is then manipulated by computer-implemented algorithm run on the computer to add a ghost child into the tree structure where a node does not have children. The data in the tree structure is then sorted according to reporting lines by computer-implemented algorithm run on the computer. Radial structure is added to the tree structure by computer-implemented algorithm run on the computer, by implementing the following steps:
   a. assigning a radial parameter to each node based on the level of the node,
   b. assigning an angular parameter to each of a first set of nodes corresponding to nodes in the level furthest from the root based on a predefined symmetry constraint, and
   c. assigning an angular parameter to each node not in the first set of nodes based on angular parameters assigned to the node's children.

The assigned radial and angular parameters are then used to automatically plot the nodes in a series of concentric circles.

In another aspect, the node data have at least one parameter, such as a business or performance parameter, linked to the nodes. The radial structure is added to the tree structure by computer-implemented algorithm run on a computer, by implementing the following steps:
   a. assigning a radial parameter to each node based on the level of the node, and
   b. assigning an angular parameter to each a portion of the nodes based on the linked parameter.

In yet another aspect, the computer-implemented tool can generate a series of evolving radial organizer charts that show the user selected parameters and node data evolving over time. This is accomplished by storing a time attribute in association with each node and using the time attribute to filter the ingested data into a set of different time-specific snapshots. The tool stores these snapshots and then replays them as a time sequence. Users can also conduct "what if" scenarios, viewing the effect on an organization if certain changes are made. For instance, users could eliminate a level of management and see what the organization would look like after the proposed changes have been made.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 7 is a data structure diagram, useful in understanding the computer program code examples provided;

FIGS. 8a-8e depict several different radial organizer chart examples;

FIG. 9b showing a dense organization;

DESCRIPTION OF PREFERRED EMBODIMENTS

Figure 1:
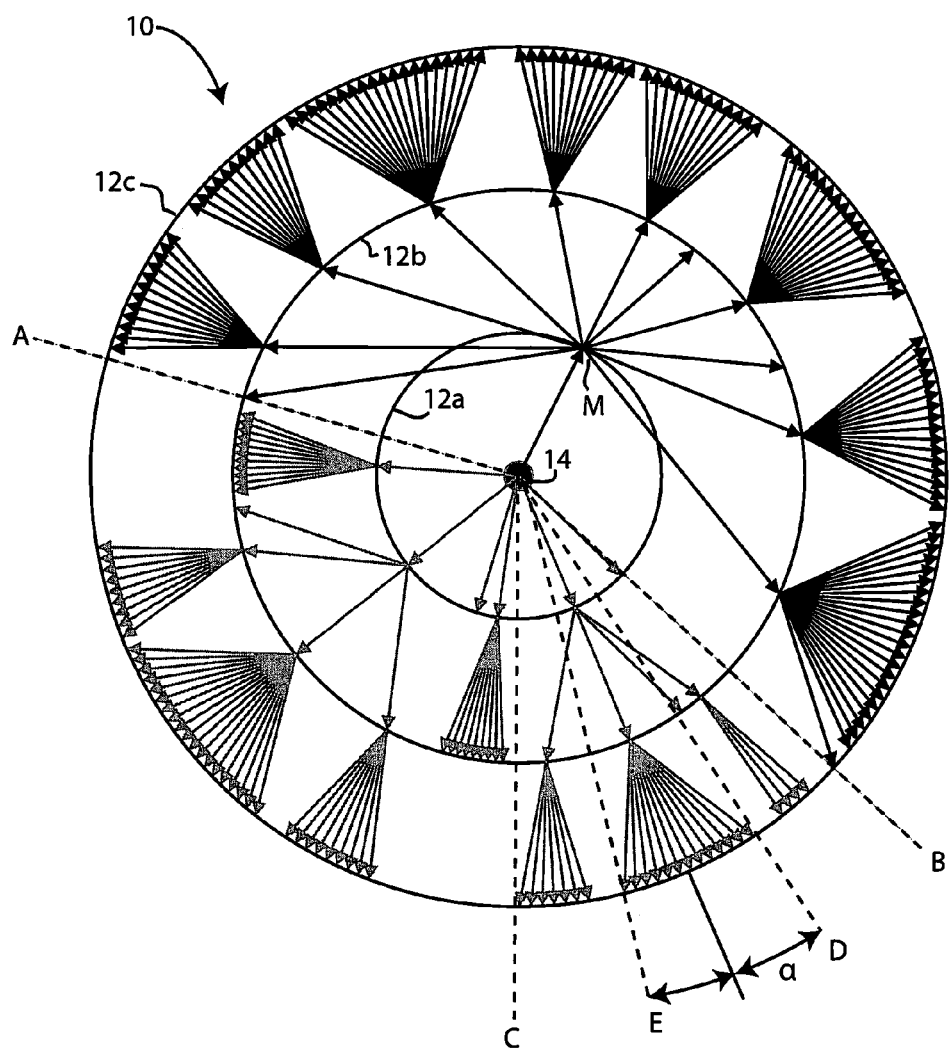
FIG. 1 is an exemplary radial organizer chart, showing some of the presentation features that are generated by the computer-implemented tool.

Referring to FIG. 1, an exemplary radial organizer chart has been illustrated. In a preferred embodiment, the chart is rendered using different colors to highlight different aspects of the organization being analyzed. A black and white rendering is presented here to conform to patent office printing requirements.

As seen, the radial organizer chart 10 defines a plurality of different hierarchical levels, presented as concentric rings 12a-12c centered about the root node 14. Placed on these concentric rings are groups of nodes (represented as points), with radial connecting lines (arrows) depicting the relationship between a node and its parent one level up (inward). The computer-implemented tool generates the radial organizer chart using information supplied to it from a computer database, such as a human resources database.

The tool generates the radial organizer chart to have certain properties, some of which may be seen in FIG. 1. As illustrated, the nodes are sorted by reporting line hierarchies, so that nodes reporting through a common parent are grouped together. The tool automatically enforces a symmetry property to ensure that the entire circular space occupied by the chart conveys information and is thus fully utilized. As seen, this symmetry property allows a viewer to appreciate at a glance the relative proportion (e.g., in terms of head count, in the case where nodes represent people) of one group of nodes versus another. For example, in FIG. 1, the group of nodes clustered between lines A and B represent nearly half of the overall company headcount. The tool implements a computer-implemented algorithm that ensures, in one embodiment, that the total angle spanned by each sub-organizational group (such as the group between lines A and B) is directly proportional to the total number of nodes (representing resources) in that branch or sub-organizational group. In another embodiment, instead of headcount, the tool assigns the angles based on a different metric that has been linked to the nodes. For example, if the nodes represent people, the angles can be distributed proportionally to the cost of those people.

In this regard, while FIG. 1 may be considered as depicting headcount, where nodes represent people, resources other than people can be represented instead. For example, the nodes can represent mechanical assets, such as vehicles in a fleet, or the nodes can represent other business metrics, such as cost.

The tool enforces another rule that places nodes in an evenly spaced arrangement in the outermost ring (e.g., ring 12c), leaving space through a mechanism called "ghost nodes" where there are no resources in that portion of the outermost ring. Because the concentric rings represent levels, where the outermost ring is furthest from the root node, the nodes in the outermost ring represent the hierarchically lowest level nodes. These are sometimes referred to herein as leaf nodes. In effect, the tool spaces the lowest level (leaf) nodes evenly, as if the entire organizational structure was dense, i.e., as if all nodes have the same number of children at all levels. An actual organizational structure may not actually be this dense, as exemplified by the structure represented in FIG. 1. The tool thus spaces the higher level nodes of a cluster so that they fill the angular space defined by the outermost nodes. Note, for example, how the parent and grandparent nodes of the cluster between lines A and B are spread out to fill the angular space between lines A and B. The computer-implemented algorithm achieves this by adding spacing so that the main symmetry is maintained at all levels.

The computer-implemented algorithm places each parent node so that it lines up with the median angular position defined by its child nodes. For example, in FIG. 1, note how the group of nodes between lines D and E defines a median angle α and that parent nodes at each concentric level are placed on that median angle.

Figure 2:
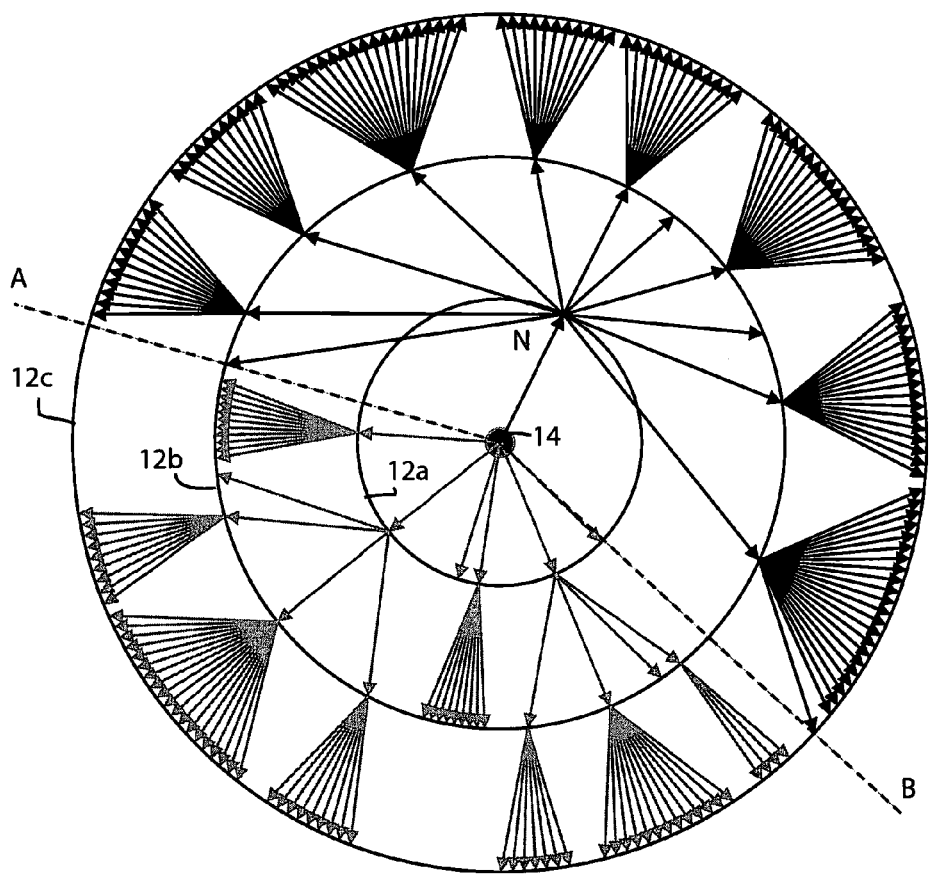
FIG. 2 is another view of the chart of FIG. 1, showing additional presentation features.

Referring now to FIG. 2, another radial organizer chart has been provided to illustrate how the tool allocates node spacing to reflect the total number of resources in an entire sub-organization. As previously explained, while space allocation can be based on the number of nodes, as illustrated, it can also be based on other metrics that are linked to the nodes (for example cost). In FIG. 2, note how the spacing of node N at level 12a reflects the total number of resources in the entire sub-organization between lines A and B, and not just the nine resources (nodes) that lie on level 12a.

Description of Computer Server Implementation

Figure 3:
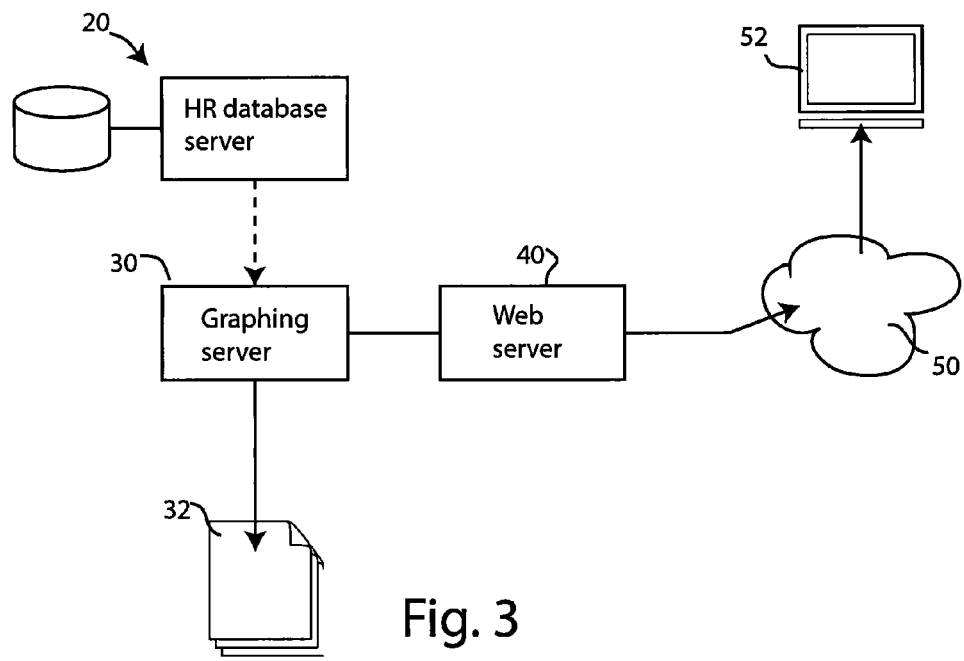
FIG. 3 is a system block diagram illustrating several mechanisms to generate and furnish the radial organizer chart.

FIG. 3 depicts one embodiment of the organization analytical tool that supports both locally generated reports 32 containing radial organizer charts and browser-based reports sent to a user computer 52 via a network 50, such as the Internet. The basic configuration contemplates a database server, such as a human resources (HR) database server 20 that supplies hierarchically structured data to the graphing server 30. The graphing server 30 performs the computer-implemented algorithms discussed herein and includes a report generation print engine to generate the reports 32. The graphing server 30 is also coupled to or includes a web server 40 that supplies the radial organizer charts as content that is embedded in web pages made available to user computers 52 running suitable browser software.

Figure 4:
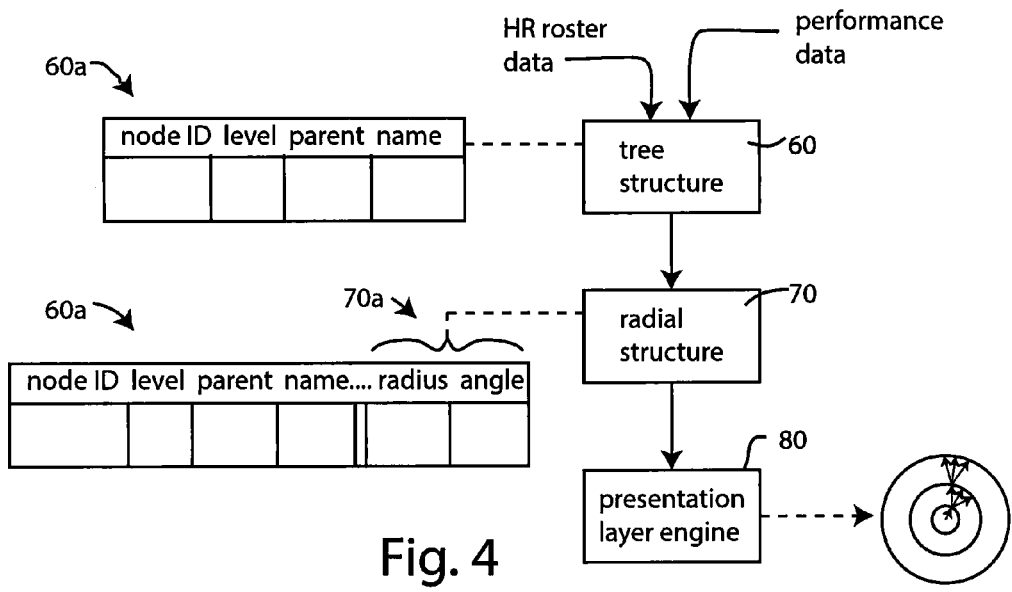
FIG. 4 is a flow diagram with associated data structures, illustrating the overall operation of the computer-implemented algorithm.

The graphing server 30 is programmed as shown in FIG. 4 to implement a first data structure, identified as tree structure 60. If desired this tree structure may be implemented using a relational database management software, such as Oracle, Microsoft SQL Server, MySQL, PostgreSQL, or the like. The tree structure may be implemented using a table, as illustrated at 60a where each node (node ID) has parent and child attributes that serve as pointers to other nodes, by designating that node's node ID.

In a standard org chart each child node will typically have one parent node, representing the direct reporting line. In some instances a node may have multiple reporting lines, hence multiple parent nodes. Where multiple parents are present in the data a separate record in the table will be entered for each parent. Thus a node with two reporting lines (two parents) would occupy two rows in the table at 60a. In the case of multiple parents the server flags those nodes by setting flags in the data structure to allow subsequent special treatment as may be needed.

The graphing server 30 ingests data from the HR database server 20 and populates this tree structure 60 as will be more fully explained. The tree structure 60 thus captures the hierarchical information needed to generate the radial organizer chart. However, the native sort order of data as ingested from the HR database server cannot be guaranteed to conform to the layout requirements of the radial organizer chart being generated. Moreover, the ingested data, being originally intended for other HR purposes, will not contain graphical parameters needed to generate the radial organizer chart. Thus the graphing server 30 manipulates the data within tree structure 60, adding ghost nodes, computing radial lengths, manipulating sort order and determining angular positions for each node, so that the radial organizer chart can be generated. These manipulation steps result in the generation of the radial structure shown at 70. The radial structure captures and stores the additional positional information needed to generate the radial organizer chart. In one implementation the data manipulation steps to ingest data into the tree structure and to generate the radial structure may be effected using database SQL commands.

Depending on the implementation chosen, the radial structure 70 need not be entirely separate from the tree structure 60. Rather, the radial structure 70 may be appended to each record in the tree structure, thus associating to each node in the tree structure a set of polar coordinates by which the graphing server plots each node in the proper position within the chart. This has been illustrated diagrammatically in FIG. 4 at 70a, where the radial structure attributes are appended to the tree structure node data.

Once the radial structure 70 has been generated, the graphing server invokes a presentation layer engine 80 that plots the node data using the polar coordinates and level information specified in the tree structure and radial structure to determine where each node is placed. In one implementation, the presentation layer engine may be implemented using a graphing engine implemented in Microsoft Visual Basic or other graphics scripting language. In such implementation the tree structure and radial structure data may be fed in tabular form to a spreadsheet program, such as Microsoft Excel, or other charting program to which the graphing engine has access. In an alternate embodiment the radial structure data are fed directly to a graphing engine associated with the database management system used to implement the virtual reporting tree.

Figure 5:
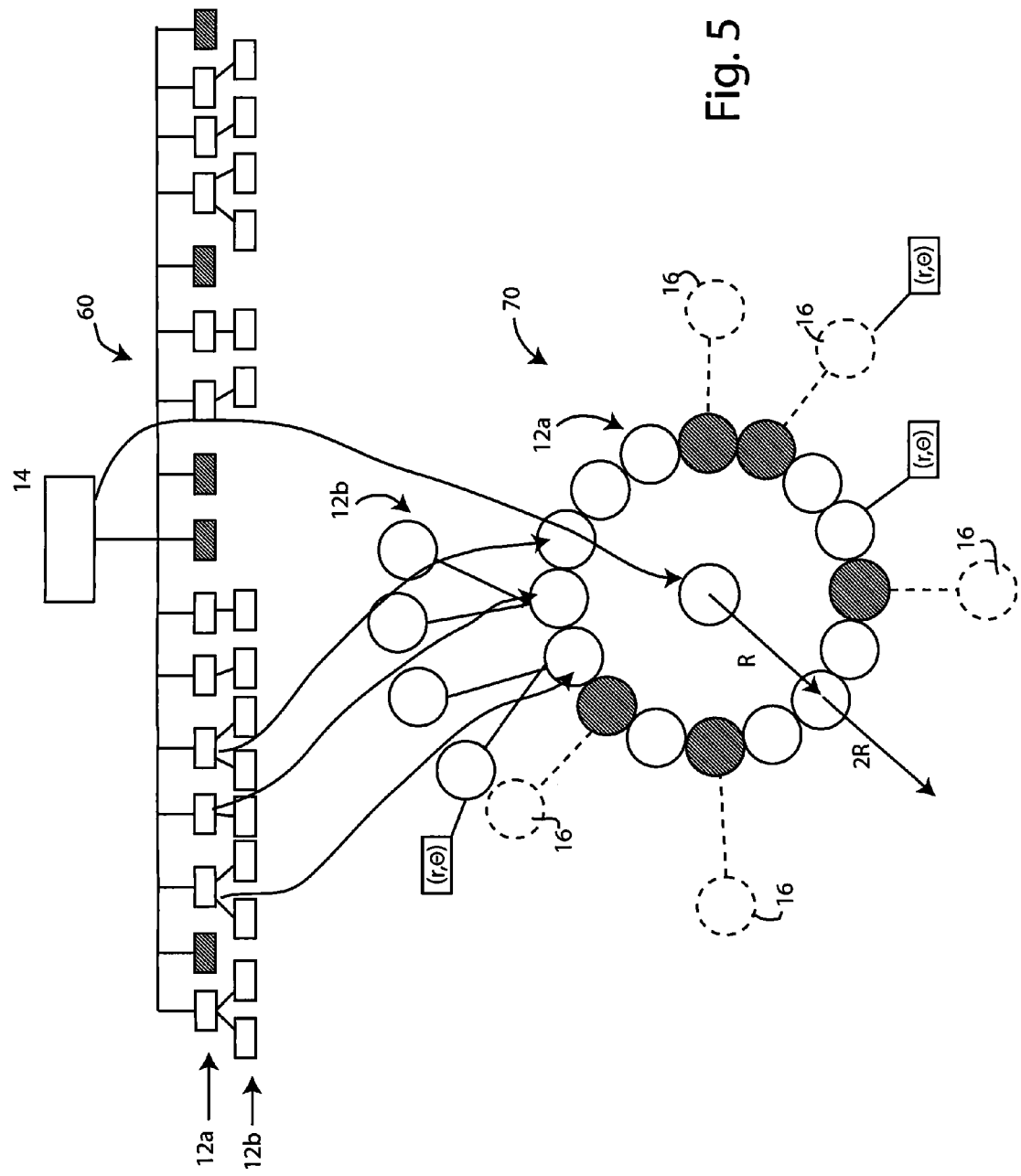
FIG. 5 is a diagrammatic view illustrating the relationship between the tree structure and the radial structure, useful in understanding some of the principles of the computer-implemented chart generation method.

By way of further explanation regarding the generation of the radial structure, refer now to FIG. 5, which shows a portion of an exemplary org chart that has been ingested into the tree structure 60 and used to generate the radial structure 70. It will be understood that FIG. 5 presents a diagrammatic view that contrasts the "flat" hierarchical structure of the tree structure 60 with the "circular" hierarchical structure of the radial structure. This has been done to facilitate the explanation. In an actual computer implementation, however, the data in both tree structure 60 and radial structure 70 are expressed in tables suitable for manipulation using SQL commands of a database management system.

FIG. 5 shows a portion of the tree structure at 60, specifically including the root node 14 and a plurality of children of root node 14 corresponding to level 12a. Some of these children nodes at level 12a, in turn, have children at level 12b. In this example, some of the level 12a children do not have any children in level 12b. These have been shaded in FIG. 5.

The tree structure 60 can be visualized as being curled up into a circular configuration as at 70. To simplify the illustration, only a few of the level 12b nodes have been depicted at 70. In generating the radial structure, the graphing server generates ghost nodes 16 (depicted in dashed lines) as placeholder children for all childless nodes (shaded). In addition, the graphing computer determines the total number of reporting level tiers or layers and uses that information to determine a radius length (R) for each level. This radius length defines the spacing between layers when those layers are arranged as concentric circles. Thus for example, for a radius length r, the innermost layer 12a will lie at a radius of R from the root node; layer 12b will lie at a radius of 2R from the root node, and so forth. In an alternate embodiment the radius and other graphical parameters can also be set by the user.

In addition to radius length, the graphing server also determines a radial position for each node, corresponding to the angular position where each node is placed around its circular level. This angular position may be thought of as positions around the dial of an analog clock. One node might be positioned at 3 o'clock, another at 4 o'clock and so forth. In an actual implementation these angular positions may be represented by angular degrees, where each circular level comprises 360 degrees. In this way, the graphing server assigns a polar coordinate to each node $(r, \theta)$, where r corresponds to the radius for that level (R, 2R, etc.) and $\theta$ corresponds to the angular position in degrees, radians or other suitable measure. The radial structure 70 thus appends this polar coordinate information to each node in the entire data structure. As will be seen, the preferred embodiment also assigns such positional information to the ghost nodes, although the ghost nodes are ultimately removed or ignored when the database is prepared for plotting.

Figure 6:
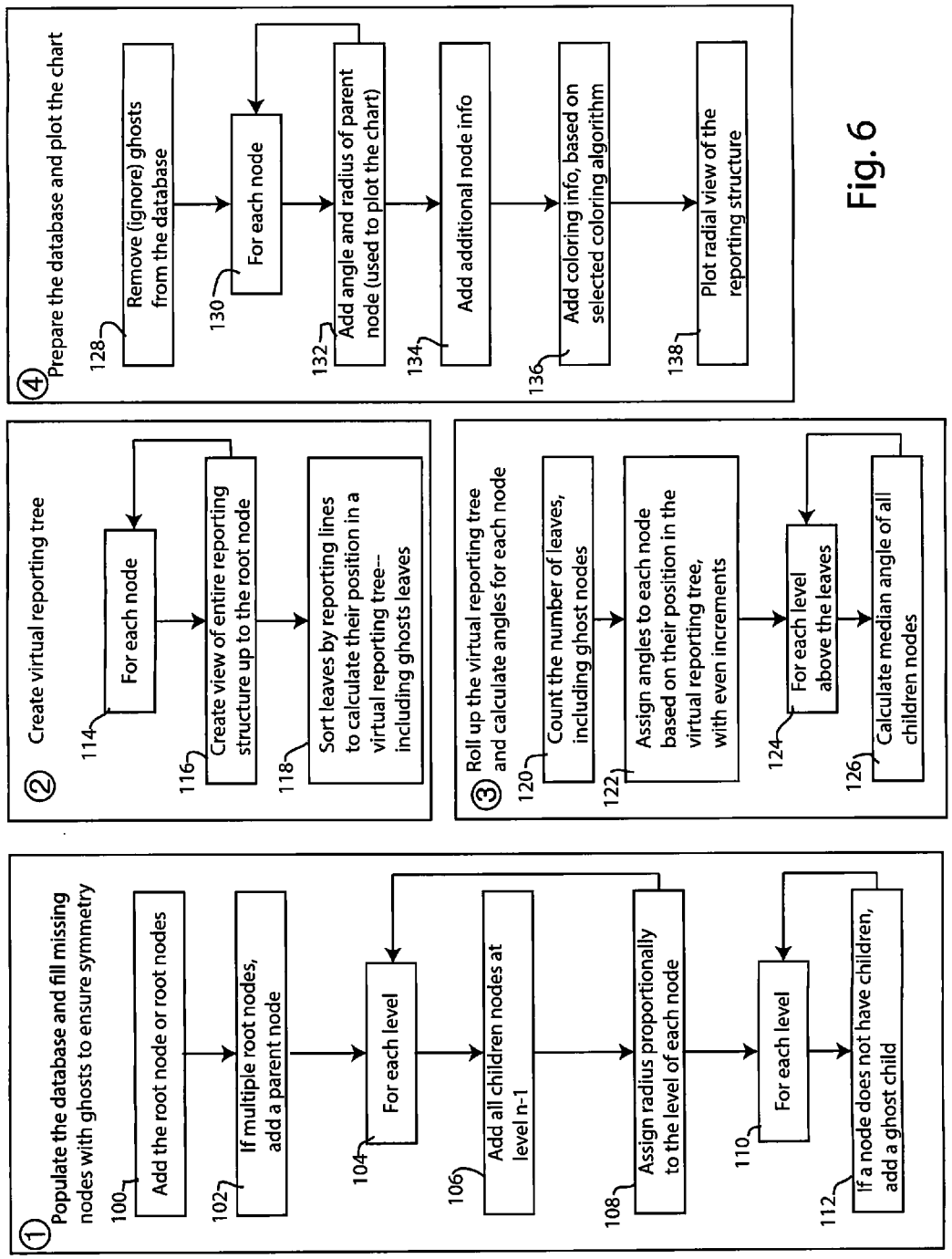
FIG. 6 is a detailed flow diagram showing the computer algorithm steps performed by the tool in generating the radial organizer chart.

The computer algorithm by which graphing server generates the tree structure 60 and its associated radial structure 70 will now be described with reference to FIG. 6. The algorithm comprises the following basic steps:

1. Populate the database and fill missing nodes with ghosts to ensure symmetry.
2. Create a virtual reporting tree.
3. Roll up the virtual reporting tree and calculate angles for each node.
4. Prepare the database and plot the chart.

The details for each of these steps have been shown in FIG. 6 and will now be described.

Populate the Database and Fill Missing Nodes with Ghosts to Ensure Symmetry

The graphing server begins by ingesting data from the HR database server and populating a tree structure 60 (FIG. 5) instantiated and mediated by the graphing server in the non-transitory memory of the graphing server. The tree structure is populated with data, preferably beginning with the root node or root nodes, if multiple ones are present [step 100]. If there are multiple root nodes, the tree structure is augmented to add a parent node, making each of the plural root nodes children of that parent [step 102].

Then, for each level [step 104] a series of steps [106, 108] are performed. First all children nodes of the root node(s) are added to define level n–1 [step 106]. A radius length is then assigned to that newly defined level, based on its position relative to the root [step 108]. Thus, with reference to FIG. 5, the children of the root node are assigned a radius length R. The process then iteratively repeats, defining level n-2 [step 106, second iteration] and assigning a radius length 2R [step 108, second iteration]; then defining level n-3 and radius length 3R, and so forth until all nodes have been assigned. Then, for each level thus created [step 110] ghost nodes are created for each node that does not have children [step 112]. The graphing server sets a flag for all ghost nodes, so that it is later able to determine which nodes were ghost nodes in the final processing steps.

At this point in the process the graphing server has laid out all nodes, including ghost nodes and has determined the radial length (R, 2R, etc.) that defines the spacing between concentric circle levels of the radial organizer chart. However, as noted above, the data ingested from the HR database server may not necessarily have provided the data in the proper sort order to generate the chart with the desired symmetry and parent-child groupings as featured in the examples of FIGS. 1 and 2. Thus the graphing server next creates a virtual reporting tree in which the nodes are grouped to generate a proper radial organization report.

Create Virtual Reporting Tree

Specifically, for each node [step 114] the graphing server creates a view of the entire reporting structure up to the root node [step 116]. This is accomplished by performing a SQL command to select the entire set of ingested data, so that all nodes are held within the virtual memory of the graphing server. In this regard, it will be appreciated that the virtual memory retains the information throughout the process of sorting the leaves and is thus "non-transitory" during this active use. The virtual reporting tree is created by sorting the leaf nodes (outermost nodes, furthest from the root node) by reporting lines (i.e., by parent-child relationship) so that all children of a given parent are sorted next to each other. This sorting process is carried out on all leaf nodes, including ghost leaves [step 118].

At this point in the process the graphing server has now determined the side-by-side relationship among nodes occupying a common level. However, the precise angular positions where those nodes will be placed have yet to be determined. Thus the graphing server next determines precisely where each node should be placed, starting with the leaf nodes.

Roll Up the Virtual Reporting Tree and Calculate Angles for Each Node

The graphing server "rolls up" the virtual reporting tree by selecting the leaf nodes occupying the outermost level, furthest from the root node. By numerically counting the number of leaves, including ghost nodes [step 120] the graphing server determines how much space will be needed to layout the chart to maintain symmetry. It does so by assigning angles to each node, based on that node's (side-by-side position in the virtual reporting tree). A predefined layout algorithm is used to accomplish this, such as by assigning each node to radial locations to achieve an even distribution of inter-node spacing [step 122]. Thus for example, if the number of leaf nodes were twelve, the graphing server would assign each node equally around the circumference as numbers on an analog clock would be assigned. As noted above, as an alternative to plotting angles by proportionally spacing the nodes, the angles can be plotted using a different business metric linked to the nodes, such as cost, for example.

Then, for each level above the leaf node level [step 124] the graphing computer calculates the median angle of all children nodes [step 126]. In other words, a group of leaf nodes related to a common parent are arranged with equal spacing, and that spacing defines a medial angle which bisects the angle spanned by that group. This was illustrated in FIG. 1 where the angle α bisects the group of nodes between lines D and E. By calculating the median angle of all children nodes, the graphing server is then able to place the parent node at the angular position defined by that median angle.

At this point in the process the graphing server has now determined a radial position and an angular position for each node, thus assigning a polar coordinate to each node. [r, θ].

Prepare the Database and Plot the Chart

The final processing steps entail first removing or otherwise ignoring all ghost nodes from the database [step 128]. The graphing server accomplishes this by searching for and excluding all nodes whose flags were previously set indicating those as ghost nodes. Then for each non-ghost node [step 130] the graphing server uses the polar coordinate (radius and angle) to plot that node at the proper location [step 132]. Depending on the implementation, the radius value can be stored in precomputed form (R, 2R, 3R, etc.) or the radius values can be computed by the graphing server on the fly, by multiplying the nominal radius value R with an integer representing the hierarchical level number.

If additional information from the HR database server, or other information sources are to be included in the chart, the graphing server associates that information with each node at this time [step 134]. Likewise the graphing server associates coloring information with each node [step 136] according to the coloring choices selected by the user. Several examples of such coloring will be described in connection with the additional FIGS. 8a-8e, discussed below. Finally, with all of the information for each node now assembled, the graphing server plots the radial view of the reporting structure as a radial organizer chart [step 138]. If desired, the final plotting step can be performed by selectively plotting only a user-selected number of levels. Thus the user can "zoom in or out" to see a fewer or greater number of levels. See FIGS. 10a-10c for an example.

As indicated above, this final plotting step may be performed by the graphing server directly, or the graphing server can export data to a graphing engine or presentation layer engine associated with a separate server. In this regard, the presentation layer engine may be associated, for example, with the web server 40 (FIG. 3). Alternatively, as discussed, the presentation layer engine may be associated with a separate software package that supports the ability to prepare charts based on vector information, where the radial and angular positions of each node comprise the vector information to be plotted. In such an implementation nodes would be represented as points around the circumference of the circle corresponding to that node's level and radial arrow lines are generated between parent and child nodes, effectively connecting the dots defined by the parent and child nodes' respective polar coordinate (vector) positions. The color of the radial arrow lines are thus dictated by the associated coloring information that was added by the graphing server.

Comparative Radial Organizer Charts

In an alternate embodiment, plural sets of data may be ingested by the graphing server, corresponding to node data values taken at different times, or under different conditions and then viewed dynamically. For example, to perform a scenario analysis, the same subset of the organization can be charted and compared under different conditions and then displayed back and forth to give a "what-if" view of different organizational setups for the same organization. Or, for example, a comparison analysis of different subsets of the same organization can be charted and dynamically displayed (e.g., to compare sales in one geographic region compared to another).

Timestamp data may also be added to the ingested data, for example, or timestamp information can be added to the tree structure data by extracting it from date fields within the data provided by the HR database server. Then, using this time data, different "frames" of radial organizer charts are generated, as discussed above, where each frame corresponds to a static chart using data bearing the same timestamp or other reference indicia. Then these frames are played back in an animated sequence by the graphing server. By displaying on the screen of a computer or other graphic presentation device, the viewer can see the radial organizer chart "evolve" with the passage of time.

In a further alternate embodiment the user can selectively change the root node and the graphing server automatically generates and displays a view from the selected root. In this way the user can zoom in and out of the radial organizer chart by changing the root node and see the results instantly. This facilitates a better understanding of the organization under different "what-if" scenarios. In such embodiment the user can select a node (e.g., by mouse click or finger touch upon a display screen) and the graphing server automatically generates a new radial organizer chart using the selected node as the new root node.

In addition to generating the radial organizer chart, as discussed above, the graphing server also provides user access to any additional information ingested by the system or generated by the system. This information includes information coming from the HR database or calculated by the graphing server itself. For example the HR database might supply annual sales made for each salesperson and the graphing server might calculate from those sales metric reflecting sales of new business (business that did not exist in a prior year). The graphing server makes this additional information available to the user instantly upon the user selecting a node (e.g., by mouse click or finger touch upon a display screen).

Exemplary Computer Code to Add Ghost Nodes

As described above, the graphing server adds ghost nodes as placeholders for missing nodes in order to maintain full symmetry and a linear relationship between angles and nodes. While there are various ways to program a computer to accomplish this, the following excerpt shows one way, using SQL instructions. Reference may be had to FIG. 7, which provides a graphical representation of the data structures referenced here.

```
- - Add ghosts
declare @max_lvl int;
declare @curr_lvl int;
declare @upper_level int;
set @curr_lvl = 1;
select @max_lvl = MAX(lvl) from #tmp_SPIDER_DATA;
While (@curr_lvl < @max_lvl AND @curr_lvl < 100
begin
    insert into #tmp_SPIDER_DATA (ID, name, Mgr_ID, lvl, ghost_flag, children)
    select 'G_'+ID, name, ID, (Lvl+1), 1,0 from #tmp_SPIDER_DATA where Lvl = @curr_lvl;
    set @curr_lvl = @curr_lvl + 1;
end
```

In the above computer code, #tmp_SPIDER_DATA corresponds to the tree structure 60 (FIGS. 4 and 5). This code works level-by-level, inserting ghost node records into the virtual tree structure, setting the ghost_flag so that the graphing server can later identify which nodes are ghost nodes; if the ghost_flag is not set, this indicates that the node record represents an actual node. In the tree structure table each node is assigned a unique node identifier (ID) and also stores a pointer (Mgr_ID) to the node identifier of that node's parent. The virtual tree structure also stores the level (lvl) occupied by that node. Also recorded for each node record is a field (children) which is used to store the number of real children (not ghosts) for that node. This number is then used by the graphing server to calculate the number of descendants (i.e., the total number of nodes in a sub-branch). The number of children and the number of descendants are available for use by the graphing server to identify spans of control so that a coloring function may be applied.

Exemplary Code to Position Parent Nodes to Maintain Symmetry at Higher Levels

As discussed in connection with FIG. 1, the graphing server enforces rules that maintain symmetry throughout the radial organizer chart. While there are various ways to program a computer to achieve this, the following shows one way, using SQL instructions. The same declared variables of the "add ghosts" routine are used here.

```
- - Populate angles above the leaves level
select @curr_lvl = (select MAX(lvl) from #tmp_SPIDER_DATA);
set @curr_lvl = @curr_lvl -1;
while (@curr_lvl >= 0)
begin
    EXEC ('update #tmp_SPIDER_DATA set angle =' +
    '(select AVG(angle) from #tmp_SPIDER_DATA where lvl_' +
    @curr_lvl + ' = sd.ID)' + ' from #tmp_SPIDER_DATA sd
    where Lvl = ' + @curr_lvl + ' and angle is null');
    set @curr_lvl = @curr_lvl -1;
end
```

In the above code, the operative SQL statement that populates the angles is defined by the EXEC statement, which forms the operative code by concatenating the text string code snippets delimited by single quote marks.

Exemplary Code to Define Coloring of Nodes Based on User Selected Scheme (Job Function, Country of Work, etc.

```
- -Populate coloring information
if (@color_scheme = 3)
begin
    insert into #colors (lvl_1) select distinct Job_Function
    from #tmp_SPIDER_DATA order by Job_Function asc;
    update #tmp_SPIDER_DATA set color = #colors.ID
    from #tmp_SPIDER_DATA
```

```
    inner join #colors on #tmp_SPIDER_DATA.Job_Function = #colors.lvl_1;
    insert into SPIDER_DATA_LEGEND select distinct id, lvl_1
    from #colors
    order by id asc;
end
```

In the above code the distinct values of the selected scheme, in this case "Job Function" drive the number and names of colors as seen in the "insert into #colors . . . " line above. The color IDs, inserted into the legend (see line, "insert into SPIDER_DATA_LEGEND . . . ") are later translated into RGB information for plotting the chart.

Exemplary Code to Position Nodes Based on a Performance Parameter

By way of further example, the following code demonstrates how the nodes may be positioned based on a performance parameter that is linked to the nodes. In the code below, the field measure is initialized in advance for each node with the relevant metric, e.g., cost, rating, etc. (or set to 1 for headcount). In the code below @tot contains the sum of the adopted metric for all the leaf nodes.

```
-- Populate angles information
while @counter_i < @counter_max
begin
    set @measure_i = (select measure from #tmp_angles where
        #tmp_angles.pos = @counter_i)
    set @measure_prev = (select measure from #tmp_angles where pos =
        case when (@counter_i = @counter_min) then @counter_max
        else @counter_i-1 end)
    set @measure_post = (select measure from #tmp_angles where pos =
        case when (@counter_i = @counter_max) then @counter_min
        else @counter_i + end)
    update #tmp+angles set inc = 3.14159265358979323846 * 2 *
        ((@measure_i + @measure_prev + @measure_post)/3)/@tot
            where #tmp_angles.pos = @counter_i
    update #tmp_angles set angle = (select(sum(inc)) from #tmp_angles
        where pos <= @counter_i)
            where #tmp_angles.pos = @counter_i
    set @counter_i = @counter_i + 1
end
```

Use Case Examples

Much can be learned about an organization through the radial organizer charts. For example, the chart featured in FIG. 1 exemplifies a highly polarized organization where half of the organization reports to one manager (node M).

Through the use of coloring, different aspects of an organization can be emphasized. See FIGS. 8a-8e. Because this patent document is presented in black & white, the coloring has been indicated using text in FIGS. 8a-8e. Many different aspects of an organization can be emphasized using coloring. In FIGS. 8a-8e the following aspects are featured:

8a—Org Structure
8b—Job Function
8c—Job Family
8d—Performance
8e—High/Low Cost Country.

It will be appreciated that these are simply examples. Coloring can be used in a wide variety of very powerful applications, where color communicates a "third dimension" of the display.

Figure 9B:
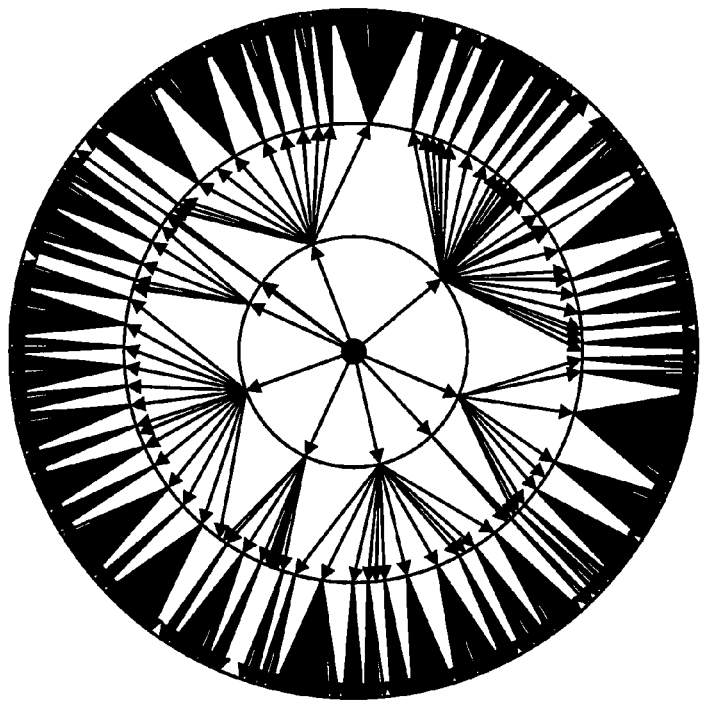
FIGS. 9a-9b depict two example radial organizer charts, FIG. 9a showing a sparse organization that is highly polarized.
Figure 9A:
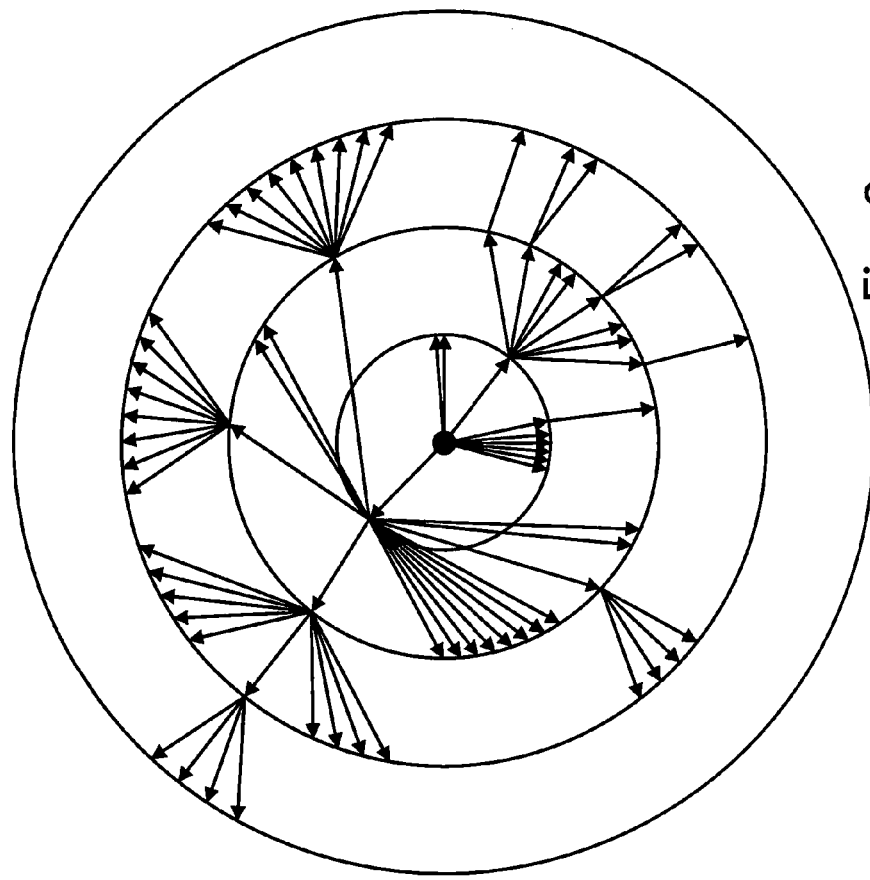

FIGS. 9a and 9b compare two different organizations, FIG. 9a a sparse organization that is highly polarized and FIG. 9b a dense organization. These charts immediately show what might not be so readily apparent by looking at the classic org charts for these organizations. Note that the sparse organization of FIG. 9a has four reporting levels, whereas the dense organization has only three reporting levels. Like the highly polarized example of FIG. 1, the organization of FIG. 9a, despite its many levels, has many people reporting to a single manager.

Figure 10C:
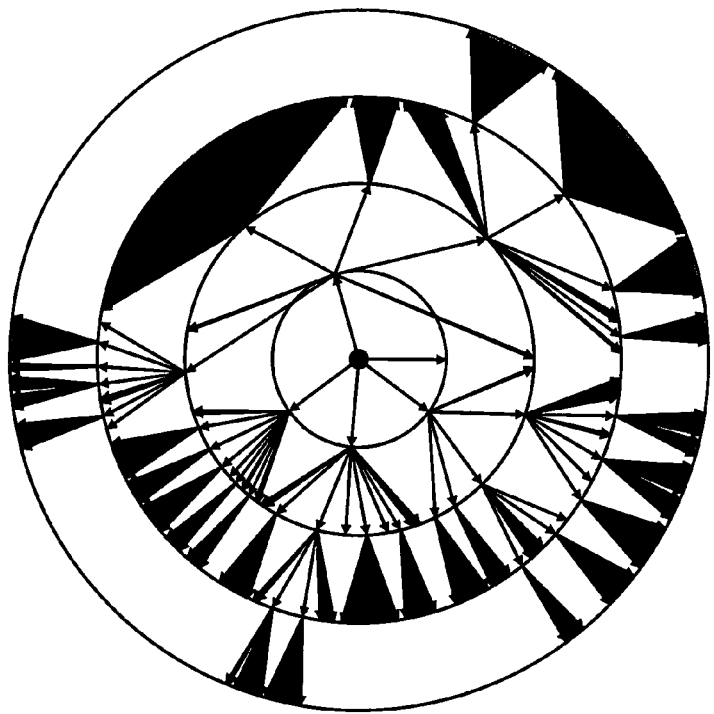
FIGS. 10a-10c depict three example radial organizer charts showing the charts in use to perform drill-down to different depths.
Figure 10A:
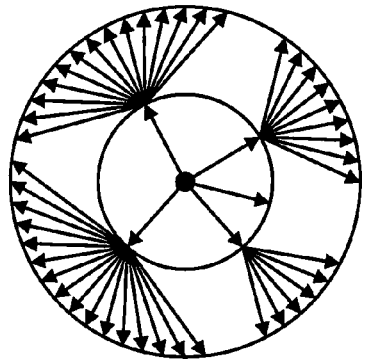
Figure 10B:
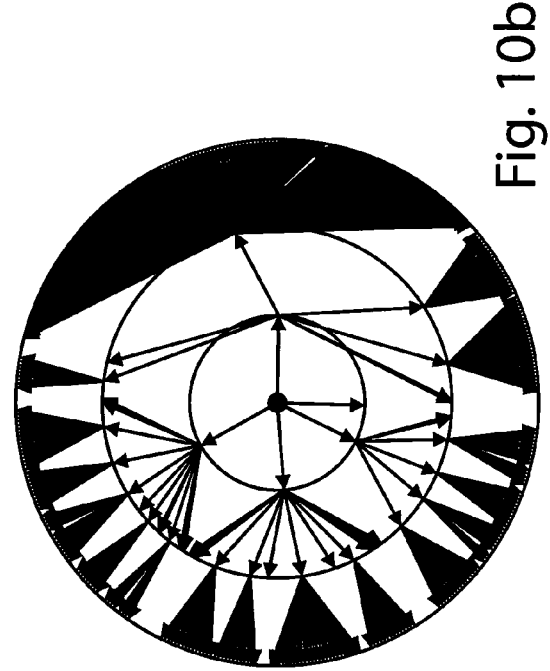

FIGS. 10a-10c illustrate how the final radial organization chart can be plotted at a greater or fewer number of levels, as selected by the user. FIG. 10a shows the chart with only the two innermost levels exposed. FIG. 10b shows the same chart with three levels exposed; FIG. 10c shows with four levels exposed. Being able to zoom in and out or "drill down" to a user-desired level can help expose aspects of the organization, possibly suggesting where the organization is out of balance. This type of information would not be apparent when looking at the organization using a classic org chart.

Figure 11:
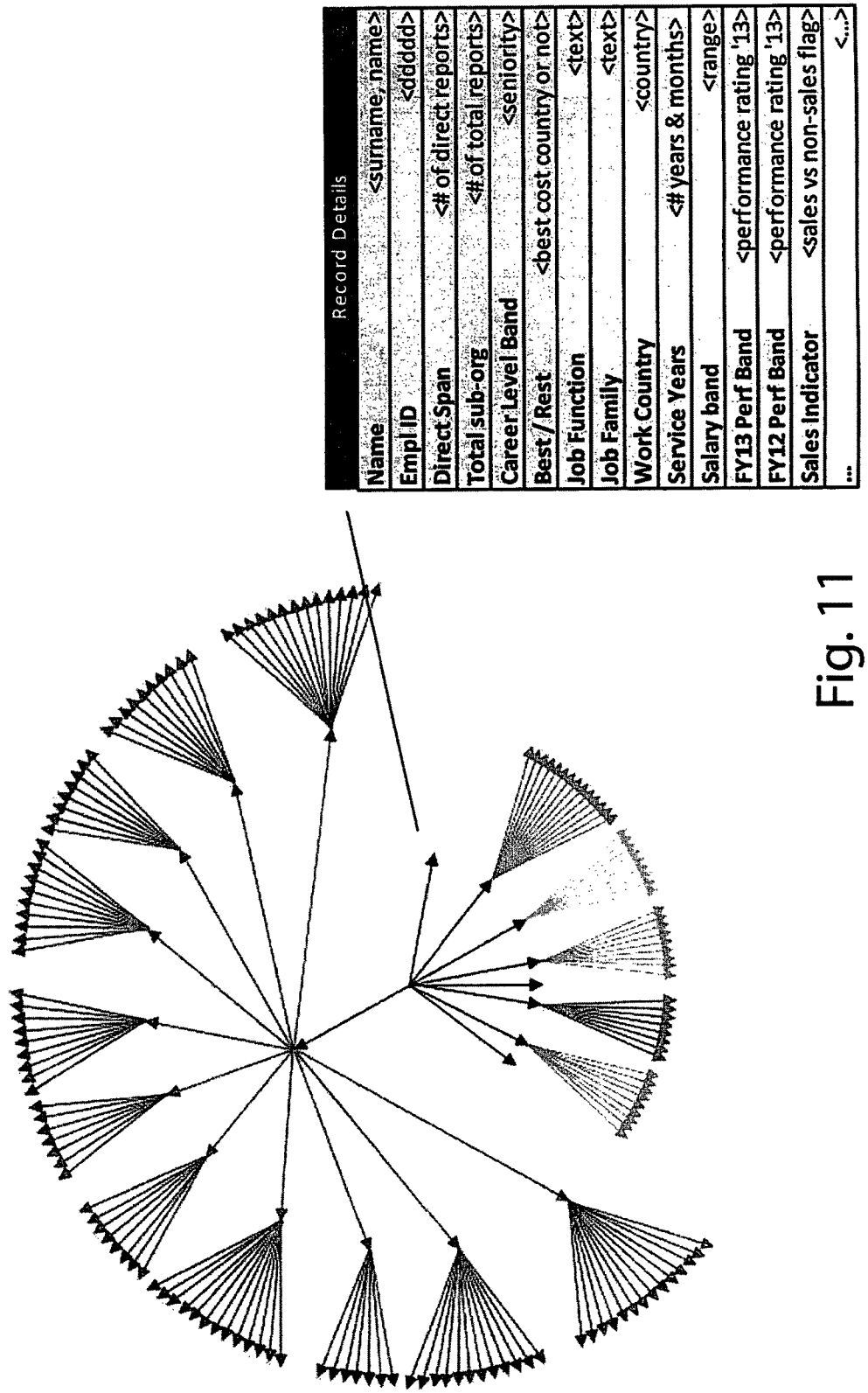
FIG. 11 is a radial organizer chart illustrating how the user can browse the organization by drilling down to reach individual information (node DNA)
Figure 12:
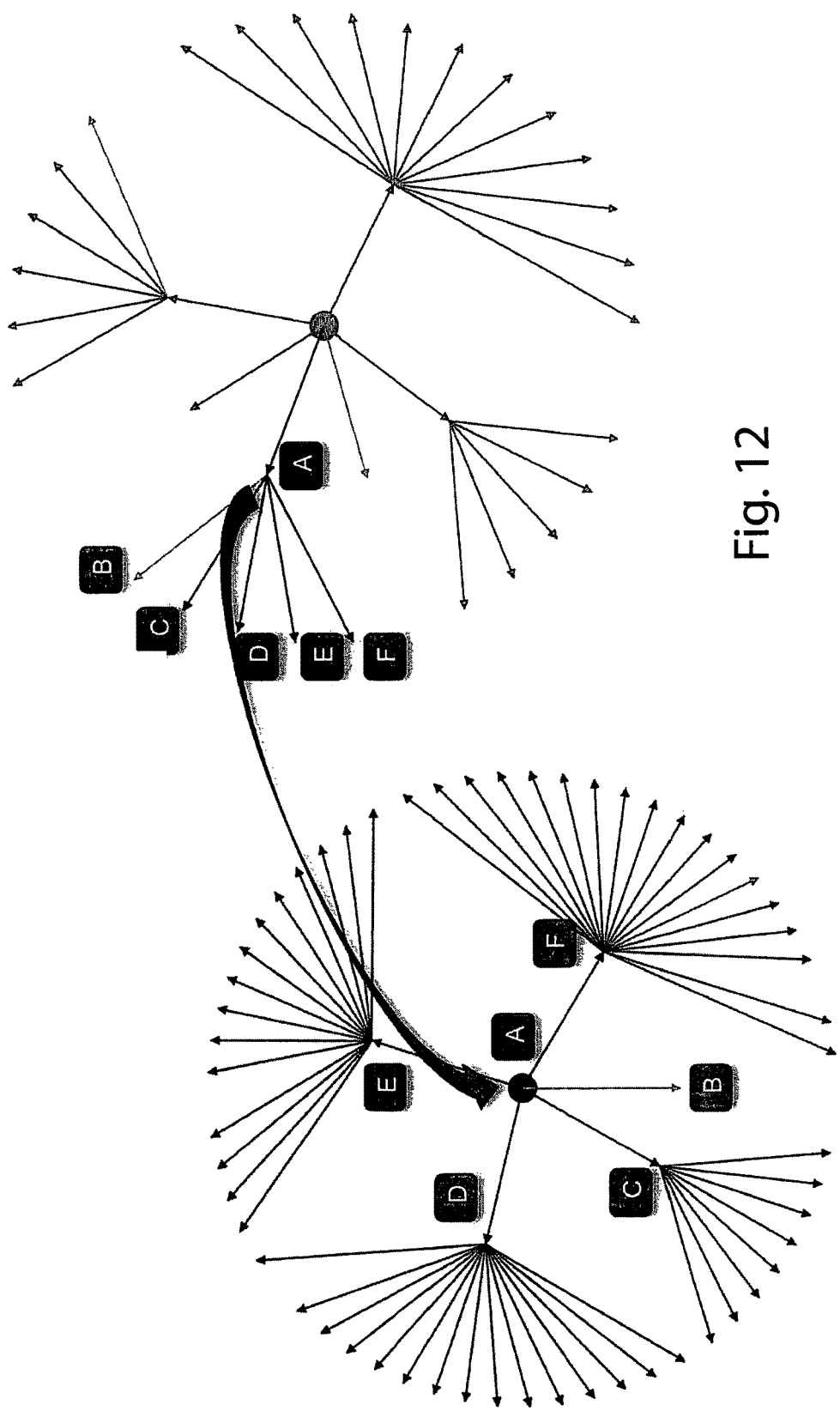
FIG. 12 illustrates a pair of radial organizer charts showing how the user can browse the organization by plotting branches and going back and forth to make comparisons.
Figure 13:
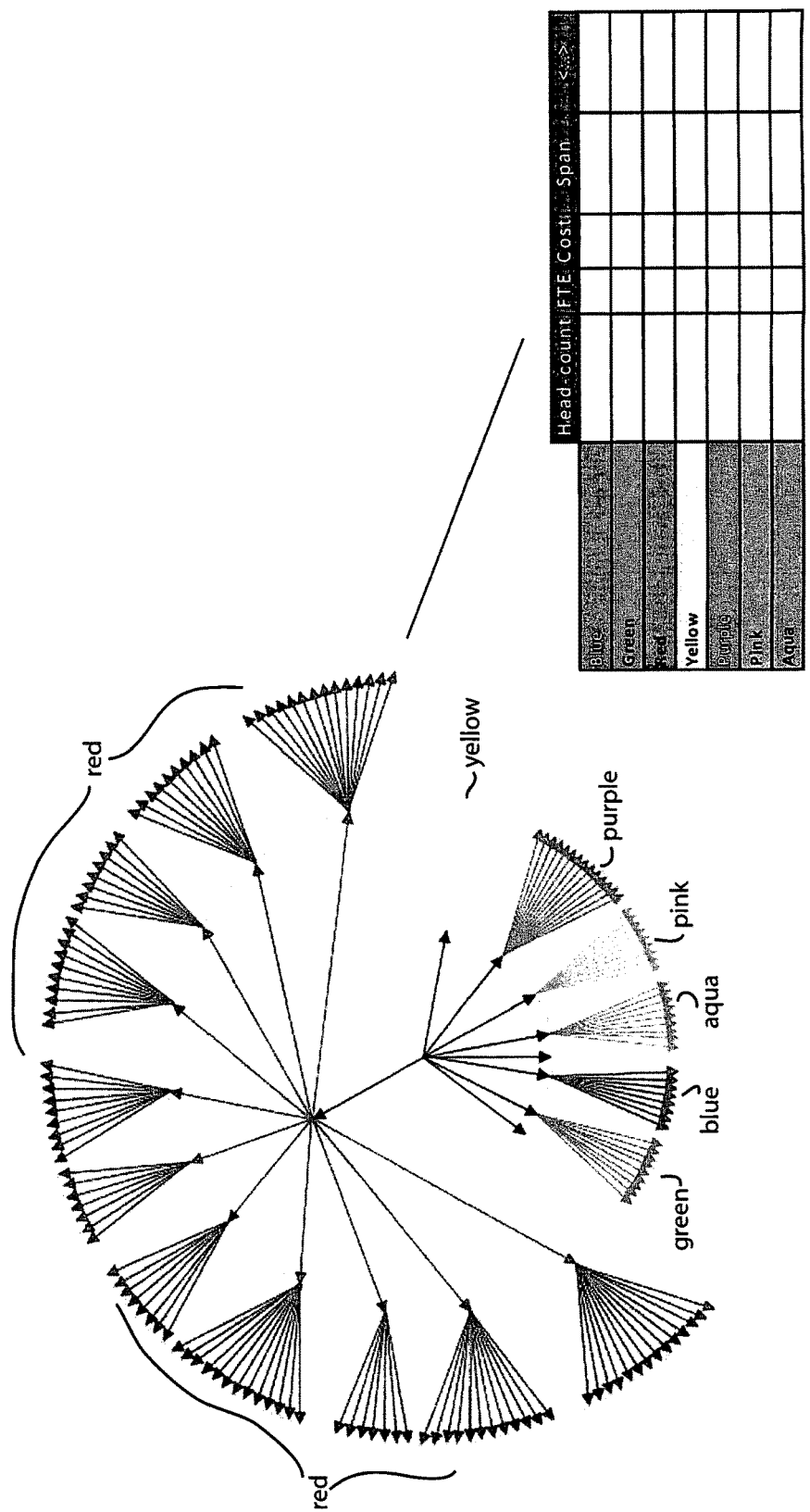
FIG. 13 illustrates another example radial organizer chart showing how the user can browse the organization by rolling up individual key performance indicators (KPI) reflecting the node DNA at a radial tree level.

FIGS. 11, 12 and 13 give additional examples of how the user can use the tool to browse the organization under study. FIG. 11 shows a non-exhaustive example where the user drills down into an individual node. This would be done, for example by touching or clicking on the node. The tool then displays the record details or "node DNA" for that node as illustrated in the accompanying table that is graphically displayed.

FIG. 12 shows another non-exhaustive example where the user can visually and interactively browse the organization under study by having the tool plot branches out of any available node (i.e., not just the root node) and then interactively flipping back and forth.

FIG. 13 shows another non-exhaustive example where the user can browse the organization under study whereby the tool rolls up individual key performance indicators (KPI) to reveal the underlying node DNA of an entire radial, or of a subset. The tool also optionally plots the data into a summary table or dashboard as shown.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of organizing and displaying hierarchically structured data of the type having hierarchically related nodes organized in plural different hierarchical levels where the nodes form parent-child relationships representing reporting lines, the method being implemented on a computer and comprising:
   using the computer, ingesting the hierarchically structured data into a computer-implemented data structure, wherein the data structure includes a plurality of levels including a root level and a leaf level, and wherein the data structure includes a plurality of nodes, and wherein each of the plurality of nodes is assigned to a respective one of the plurality of levels;
   for each level of the plurality of levels other than the leaf level:
      determining whether each node assigned to the level has an existing child relationship;
      in response to determining that a first node does not have an existing child relationship, adding a ghost node to a next one of the plurality of levels; and
      creating a child relationship for the first node with the ghost node;
   using the computer, calculating and assigning a radius for each level of the plurality of levels;
   using the computer, creating a virtual reporting tree structure in non-transitory computer-readable memory where each of the plurality of nodes, including the ghost node, is assigned a position in the virtual reporting tree structure;
   using the computer, sorting, at each of the plurality of levels, the plurality of nodes by reporting line;
   using the computer, counting a number of nodes, including ghost nodes, in the leaf level;
   calculating and assigning angular positions to each of the nodes in the leaf level according to a predefined layout based on the number;
   using the computer, calculating a median angle for each group of child nodes associated with a parent node and assigning to that parent node the median angle so calculated;
   using the computer, assigning to each node an angle and radius of its parent node, skipping ghost nodes in the assignment process; and
   plotting a radial view using the assigned angle and radius of each node to determine where that node is plotted in relation to all other nodes.

2. The method of claim 1 further comprising using the computer to test the ingested data for presence of multiple root nodes and adding to the data structure a parent to the multiple root nodes if such are detected.

3. The method of claim 1 wherein the assigned radius is proportionally assigned by the computer to each level of each node.

4. The method of claim 1 wherein the computer assigns angular positions to each of the nodes in the leaf level in even increments based on the counted number.

5. The method of claim 1 further comprising using the computer to add, to at least a portion of the nodes, additional node information extracted from the ingested data information.

6. The method of claim 1 further comprising using the computer to apply coloring information to at least a portion of the nodes.

7. The method of claim 6 wherein the computer applies a coloring algorithm selected by user input.

8. The method of claim 1 further comprising using the computer to obtain user input designating a user-selected level and plotting the radial view using only data from nodes at the user-selected level and from levels closer to and including the root level.

9. The method of claim 1 further comprising using the computer to respond to user selection of one node in a radial plotted radial organizer chart by generating a new radial organizer chart where the one node selected is treated as a root node.

10. A method of organizing and displaying hierarchically structured data of the type having hierarchically related nodes organized in plural different hierarchical levels where the nodes form parent-child relationships representing reporting lines, the method being implemented on a computer and comprising:
    using the computer, ingesting the hierarchically structured data into a tree structure maintained in memory of the computer, wherein the tree structure includes a plurality of levels including a root level and a leaf level, and wherein the tree structure includes a plurality of nodes, and wherein each of the plurality of nodes is assigned to a respective one of the plurality of levels;

for each level of the plurality of levels other than the leaf level:
determining whether each node assigned to the level has an existing child relationship;
in response to determining that a first node does not have an existing child relationship, adding a ghost node to a next one of the plurality of levels; and
creating a child relationship for the first node with the ghost node;

using the computer, sorting the data in the tree structure according to reporting lines;

using the computer, adding radial structure to the tree structure by:
assigning a radial parameter to each node, based on the level of the node,
assigning an angular parameter to each of a first set of nodes corresponding to nodes in the level furthest from the root level based on a predefined symmetry constraint, and
assigning an angular parameter to each node not in the first set of nodes based on angular parameters assigned to children of the node; and
using the assigned radial and angular parameters to automatically plot the nodes, other than ghost nodes, in a series of concentric circles.

11. The method of claim 10 further comprising associating a color parameter with at least a portion of the nodes and applying the color parameter in automatically plotting the nodes.

12. The method of claim 11 further comprising ingesting performance data associated with the hierarchically structured data and representing the performance data using the color parameter.

13. The method of claim 10 further comprising obtaining user input designating a user-selected level and plotting a radial view of the tree structure using only data from nodes at the user-selected level and from levels closer to and including the root level.

14. The method of claim 10 further comprising using the computer to respond to user selection of one node in a radial plotted radial organizer chart by generating a new radial organizer chart where the one node selected is treated as a root node.

15. A method of organizing and displaying hierarchically structured data of the type having hierarchically related nodes organized in plural different hierarchical levels where the nodes form parent-child relationships representing reporting lines and having at least one parameter linked to the nodes, the method being implemented on a computer and comprising:
ingesting the hierarchically structured data into a tree structure maintained in memory of the computer, wherein the tree structure includes a plurality of levels including a root level and a leaf level, and wherein the tree structure includes a plurality of nodes, and wherein each of the plurality of nodes is assigned to a respective one of the plurality of levels;

for each level of the plurality of levels other than the leaf level:
determining whether each node assigned to the level has an existing child relationship;
in response to determining that a first node does not have an existing child relationship, adding a ghost node to a next one of the plurality of levels; and
creating a child relationship for the first node with the ghost node;

using the computer, sorting the data in the tree structure according to reporting lines; and using the computer, adding radial structure to the tree structure by:
assigning a radial parameter to each node based on the level of the node,
assigning an angular parameter to each a portion of the nodes based on the at least one linked parameter, and
using the assigned radial and angular parameters to automatically plot the nodes, other than ghost nodes, in a series of concentric circles.

16. The method of claim 15 further comprising using the computer to test the ingested data for presence of multiple root nodes and adding to the data structure a parent to the multiple root nodes if such are detected.

17. The method of claim 15 further comprising using the computer to apply coloring information to at least a portion of the nodes.

18. The method of claim 17 wherein the computer applies a coloring algorithm selected by user input.

19. The method of claim 15 further comprising using the computer to obtain user input designating a user-selected level and plotting a radial view using only data from nodes at the user-selected level and from levels closer to and including the root level.

20. The method of claim 15 further comprising using the computer to respond to user selection of one node in a radial plotted radial organizer chart by generating a new radial organizer chart where the one node selected is treated as a root node.

* * * * *